United States Patent [19]

Iwai et al.

[11] Patent Number: 5,064,016
[45] Date of Patent: Nov. 12, 1991

[54] SADDLE TYPE VEHICLE HAVING A STORAGE RECEPTACLE

[75] Inventors: Kazuhiro Iwai, Saitama; Shinji Matsubayashi, Tokyo; Ikuo Ariga, Saitama, all of Japan; Kazuhiko Saito, Rancho Palos Verdes, Calif.

[73] Assignee: Honda Giken Kogyo Kabushiki Kaisha, Tokyo, Japan

[21] Appl. No.: 555,374

[22] Filed: Jul. 20, 1990

Related U.S. Application Data

[63] Continuation of Ser. No. 336,702, Apr. 12, 1989, abandoned.

[51] Int. Cl.$^5$ .......................... B62B 61/08; B60R 5/04
[52] U.S. Cl. .................................. 180/215; 296/37.1
[58] Field of Search ............... 180/210, 211, 215, 219; 296/37.16, 37.1

[56] References Cited

U.S. PATENT DOCUMENTS

| | | | |
|---|---|---|---|
| 4,300,706 | 11/1981 | Hendrick et al. | 224/31 |
| 4,325,562 | 4/1982 | Yamada et al. | 280/62 |
| 4,449,602 | 3/1984 | Pittman, Jr. | 280/282 |
| 4,531,606 | 7/1985 | Watanabe | 180/215 |
| 4,646,865 | 3/1987 | Imaizumi et al. | 180/73.1 |
| 4,726,439 | 2/1988 | Iwao et al. | 296/37.1 |
| 4,826,057 | 5/1989 | Yamada | 224/32 A |

FOREIGN PATENT DOCUMENTS

59-128016 7/1984 Japan.

*Primary Examiner*—Andres Kashnikow
*Assistant Examiner*—Richard Camby
*Attorney, Agent, or Firm*—Irving M. Weiner; Joseph P. Carrier; Pamela S. Burt

[57] ABSTRACT

A saddle type, off-road vehicle, comprising a frame, an engine supported on the frame, at least one front wheel, a pair of rear wheels disposed on opposite sides of the frame, and a storage receptacle provided on the vehicle having at least a portion thereof positioned above the rear frame. The storage receptacle is positioned rearwardly of the major part of the frame and above the rear axle.

18 Claims, 11 Drawing Sheets

SADDLE TYPE VEHICLE HAVING A STORAGE RECEPTACLE

This is a continuation of application Ser. No. 336,702 filed Apr. 12, 1989 now abandoned.

BACKGROUND OF THE INVENTION

1. Field of the Invention

The present invention relates to a saddle type, off-road vehicle having a storage receptacle. More particularly, the present invention relates to a saddle type, off-road vehicle having a saddle shaped seat similar to a motorcycle, a pair of rear wheels provided with balloon type, ultra low-pressure tires and swingably supported on a vehicle frame, and a relatively large storage receptacle provided on the vehicle.

2. Description of the Art

There are many known saddle type, off-road vehicles, including many three and four wheeled vehicles. These known vehicles are normally equipped with balloon type, low pressure tires for traveling through and over many different terrains. Moreover, these known vehicles have been primarily used for, and associated with, recreational purposes. It has been recognized, however, that these vehicles can be used for purposes other than recreation, such as for use on farms, ranches, forests, etc., because of their great ability to travel over many different terrains.

It is difficult to conveniently carry or transport large loads other than the rider, loads such as tools, camping equipment, etc., with most of the known saddle type, off-road vehicles because these vehicles are not provided with any covered or partially covered storage space.

In slight contrast to the general, complete absence of covered storage space, two known saddle type, three-wheeled vehicles are disclosed in U.S. Pat. No. 4,325,562 and Japanese Patent No. 59-128016, respectively, each of which includes a container positioned rearwardly of a rider's seat for containing loads, such as items of clothing, a lunch, small pieces of luggage, etc. The container disclosed in U.S. Pat. No. 4,325,562 is rather small and, correspondingly, is capable of containing only small objects. The container disclosed in Japanese Patent Publication No. 59-128016 is larger than that disclosed in the U.S. patent, but to achieve this increased size the receptacle is positioned very closely to the vehicle's rear axle, as shown in FIG. 4 of the publication. Such close positioning is undesirable because the container would tend to interfere with vertical bouncing movements of the rear axle if the container is supported separately from the axle, and because the container would be subjected to excessive bouncing and vibrations if it is supported together with the rear axle. Note that the Japanese Publication does not disclose how the container is supported on the vehicle, or how the container cooperates with the rear axle.

The present invention has been developed to overcome the above-discussed problems and disadvantages of known saddle type, off-road vehicles.

SUMMARY OF THE INVENTION

It is an object of the present invention to provide a saddle-type, off-road vehicle having a relatively large storage receptacle for conveniently storing and transporting large loads.

It is another object of the present invention to provide such off-road vehicle in which the storage receptacle is disposed at a relatively low position above the vehicle's rear axle such that the storage receptacle does not substantially increase the overall size of the vehicle, and otherwise has a sleek appearance.

According to the present invention, a saddle type, off-road vehicle is provided which comprises a frame, an engine supported by the frame, a pair of rear wheels disposed on opposite sides of the frame, at least one front wheel, a seat supported on an upper portion of the frame, a steering means positioned forwardly of the seat, a storage receptacle positioned rearwardly of the major portion of the frame, and a rear axle positioned beneath the storage receptacle.

The above and other objects, features and advantages of the present invention will become apparent from the following description when taken in conjunction with the accompanying drawings which illustrate preferred embodiments of the invention by way of example.

DETAILED DESCRIPTION OF PREFERRED EMBODIMENTS

Referring to FIGS. 1-4, there is shown a saddle type, off-road vehicle 1 according to a first embodiment of the present invention. The vehicle includes a frame 2 (shown more particularly in FIGS. 5 and 6) which supports a steering handle 4, a fuel tank 6, a saddle type rider's seat 8, a pair of front wheels 10 (each provided with a balloon type, ultra low-pressure tire) which are steered through the steering handle 4, a rear swing arm assembly 14, a drive unit 16 including an internal combustion engine and a transmission means for transferring rotative power to a pair of rear wheels 12 (each of which is also provided with a balloon type, ultra low-pressure tire), a pair of foot supports 18 provided on opposite sides of the frame, a battery 7, an air cleaner 9, a front fender 22 covering the front wheels 10, a rear fender 24 covering the rear wheels 12, and a storage receptacle 20 provided at least partially rearwardly of the major portion of the frame.

Figure 1:
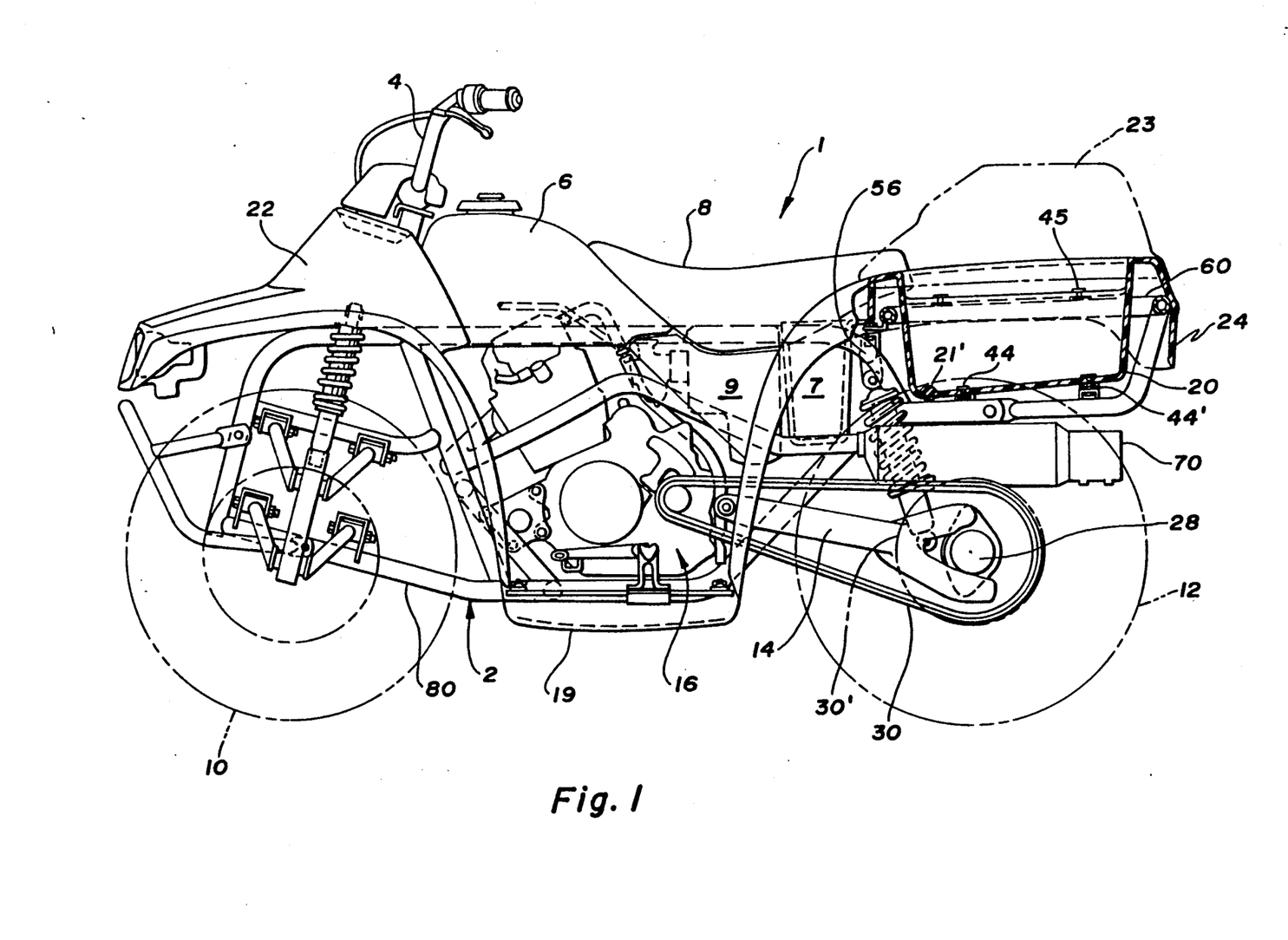
FIG. 1 is a side view, partly in section, of a saddle type, off-road vehicle according to a first embodiment of the present invention.

Note that the rear swing arm assembly 14 vertically swingably supports a rear axle 28, and that the rear wheels 12 are connected to opposite ends of the rear axle. As shown in FIG. 1, the rear axle 28 is supported on a rear end of the rear swing arm assembly 14 so that it can be readily adjusted in the longitudinal direction of the vehicle, and is rotatably driven by the transmission means of the drive unit 16 which is depicted as including a drive chain 30 and a sprocket 30' fixed to the rear axle. It will be understood that although a sprocket and chain type transmission means is disclosed in FIGS. 1-4, other known types of transmission means, such as drive shaft type, could be used in vehicles according to the present invention. Also, it will be understood that a vehicle according to the present invention could have driven front wheels as well as (or as an alternative to) driven rear wheels.

Figure 5:
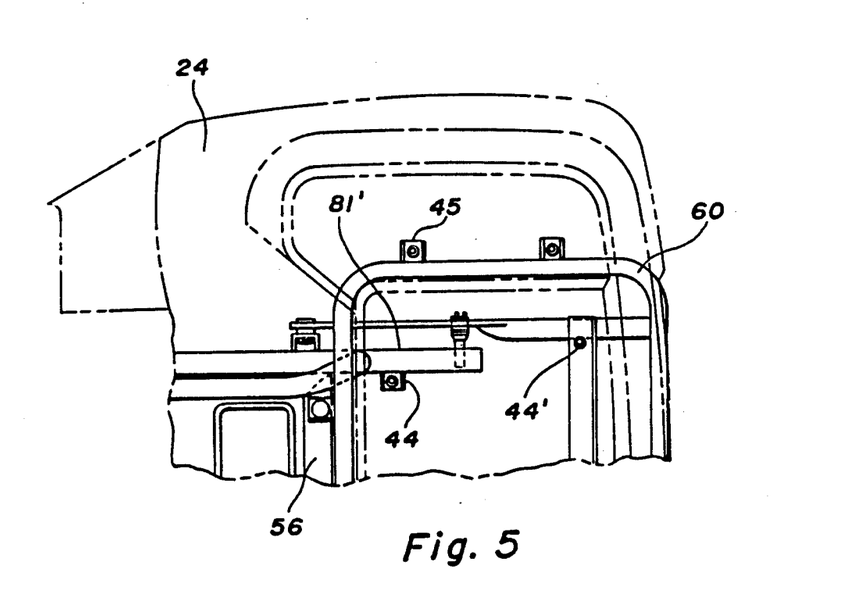
FIG. 5 is a plan view of a rear section of the vehicle shown in FIG. 1 which clearly shows the connections between the storage receptacle and the vehicle's frame.
Figure 6:
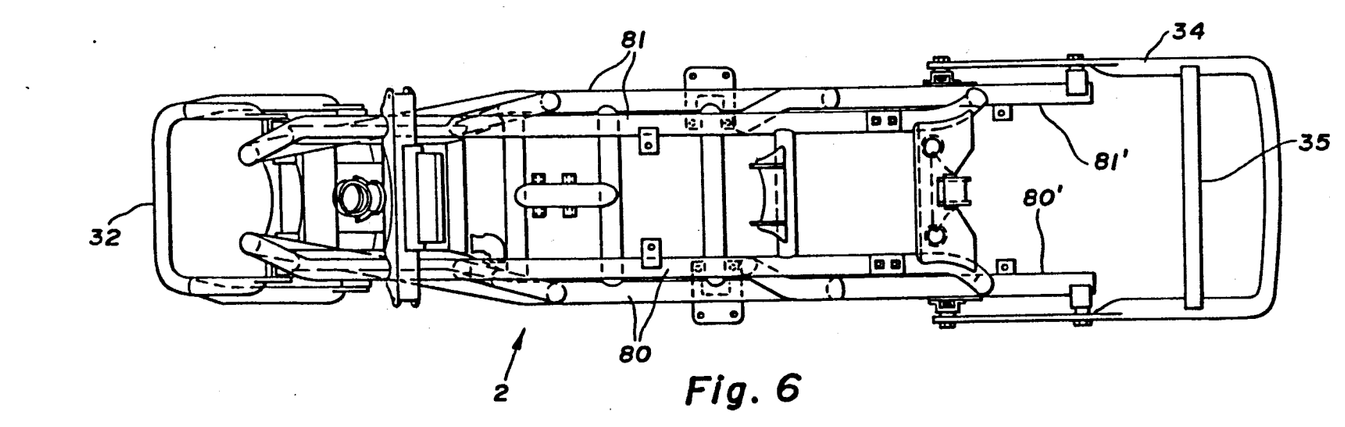
FIG. 6 is a plan view of the frame of the vehicle shown in FIG. 1.
Figure 7:
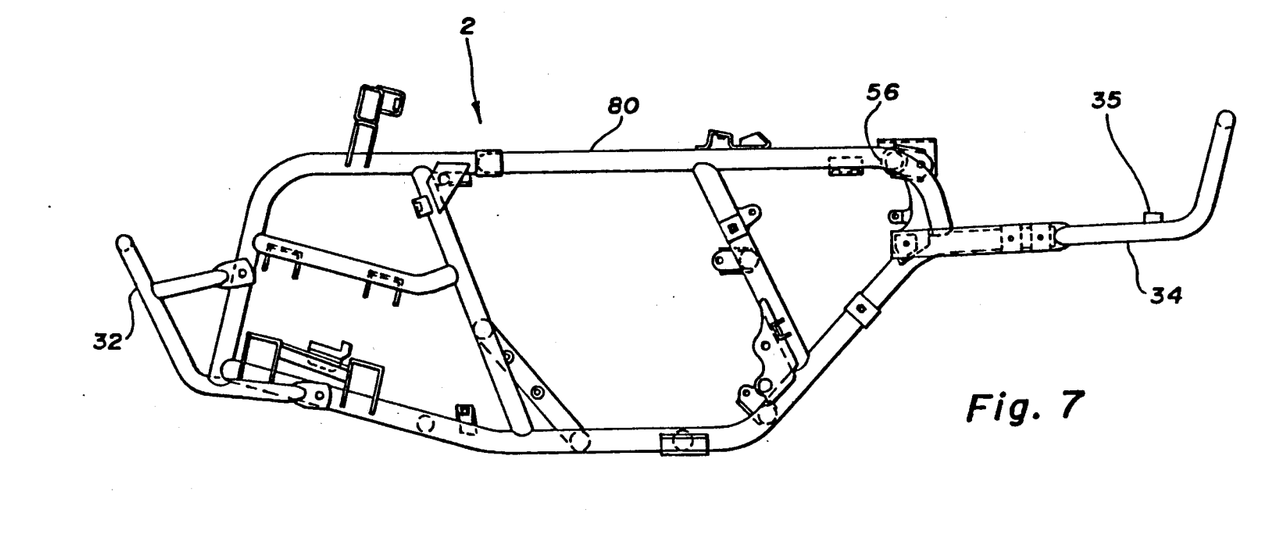
FIG. 7 is a side view of the frame of the vehicle shown in FIG. 1.

Referring to FIGS. 1 and 3-7 the frame 2 is comprised of a pair of longitudinally extending, laterally spaced sections 80, 81 and a plurality of cross members which connect and reinforce the sections 80, 81. As best shown in FIGS. 1 and 7, the major part of each section 80, 81 is generally loop shaped when viewed from the side. Such a loop shape is preferred because it provides improved strength and rigidity. As also depicted, each of sections 80, 81 preferably includes a smaller rear part 80', 81', respectively, which extends integrally rearwardly from a lower portion of the major, loop shaped part, and which functions to support the storage receptacle 20.

Although the depicted construction of the frame 2 is preferred, it will be understood that a vehicle according to the present invention could include differently constructed frames. For example, the sections 80, 81 may not include rear projecting parts such as 80', 81', whereby the storage receptacle could be supported by upper or rear surfaces of the loop shaped parts. Further, the laterally spaced sections of the frame may not be loop shaped, but rather may be simply constructed as longitudinally extending members formed from cast aluminum or the like.

The vehicle 1 also preferably includes a front guard 32 extending forwardly and upwardly from a front, lower portion of the frame 2, and a rear guard 34 extending rearwardly and upwardly from the rear parts 80', 81' of the frame 2. As shown, a rear end of the rear guard 34 preferably extends upwardly and slightly rearwardly of a lower rear end of the storage receptacle 20, and the rear guard may include one or more cross members 35 connected laterally across intermediate portions thereof to provide added strength and rigidity. The front and rear guards 32, 34 may be connected to the frame 2 using appropriate fastening means, as shown, or may be formed integrally with the frame through welding or the like.

Figure 3:
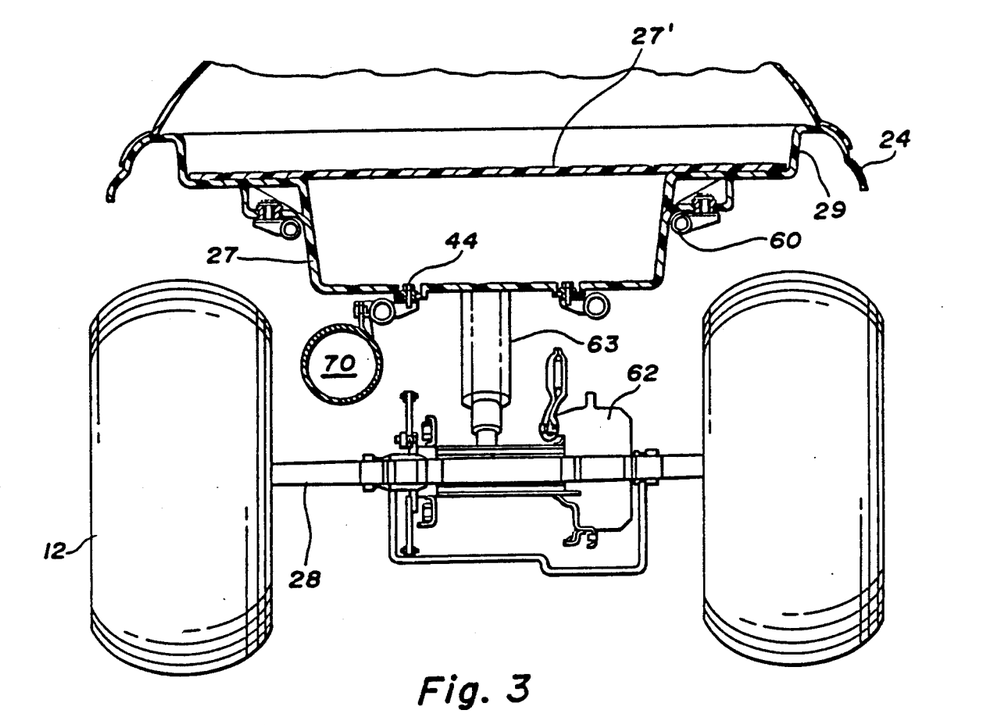
FIG. 3 is a rear view, partly in section, of the vehicle shown in FIG. 1.
Figure 4:
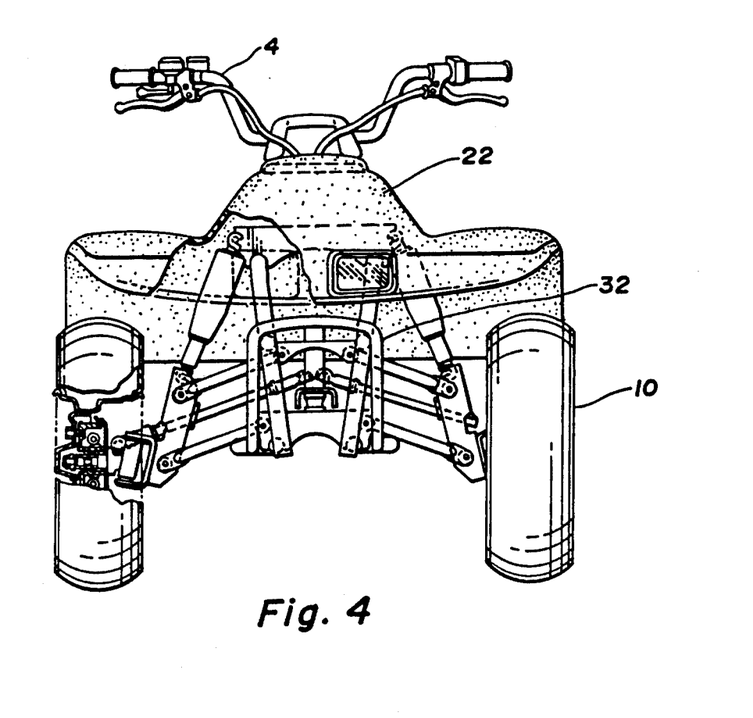
FIG. 4 is a front view, partly in section, of the vehicle shown in FIG. 1.

Vehicle 1 may optionally include a subframe 60 (as best shown in FIGS. 1, 3 and 5) to provide additional support for the storage receptacle 20. As depicted, the subframe 60 is preferably constructed as a substantially rectangularly shaped ring which includes the rear laterally extending end of the rear guard 34 at the rear end thereof, while a front end thereof is supported on a cross member 56 interconnecting the laterally spaced sections 80, 81 of the frame 2.

As shown in FIGS. 1-3 and 8-10, the rear fender 24 and the storage receptacle 20 are preferable constructed or formed as an integral unit. Such integral unit is further preferably composed of synthetic materials such as moldable plastics, fiberglass, etc., but may be constructed of other conventional materials such as sheet metal. The integrally constructed rear fender and storage receptacle unit is advantageous for many reasons, including relatively low manufacturing costs, increased structural strength and rigidity, attractive appearance, etc. Also as shown, a small receptacle 85 for substantially enclosing the battery 7 may be formed integrally with the rear fender 22 at a front end thereof.

The storage receptacle 20 preferably has a large opening 20' defined in the upper surface thereof such that its upper end is substantially completely open, with opening 20' arranged adjacent the rear end of saddle type seat 8, and whereby objects can be readily placed into and taken out of the storage receptacle. As depicted, the rear fender 24 preferably extends laterally outwardly and then downwardly around the full perimeter of the upper end of the storage receptacle thereby assuring that the upper end of the storage receptacle is sufficiently strong and rigid. Additionally, vehicle 1 preferably includes a lid 23 which can be readily secured over and removed from the open upper end of the storage receptacle 20. If desired, the lid 23 may be pivotally attached to the storage receptacle 20 or to the rear fender 24 through an appropriate hinge means, and a securing means including a latch mechanism and a lock may be provided for securing the lid in a closed position over the storage receptacle.

As depicted, the storage receptacle 20 preferably includes a lower section 27 and an upper or laterally extending section 29 which extends laterally of the lower section on both sides thereof. The lower section 27 extends downwardly from the laterally extending section 29 such that there is a stepwise structure defined between the lower and laterally extending sections. Similarly, a stepwise structure is defined between the laterally extending section 29 and the rear fender 24. Such stepwise structures may be sloped, as shown by the phantom lines in FIG. 10 in relation to the stepwise structure between sections 27, 29.

Additionally, a removable partition plate 27' (shown in FIG. 3) may be provided in the storage receptacle to separate or isolate the lower and laterally extending sections 27, 29 from each other when desired. Preferably the plate 27' will be sized to fit over substantially the entire bottom wall 29' of the laterally extending section so that it will not shift during travel. If desired the plate 27' could be pivotally secured (like a lid) within the receptacle, and may comprise several sections hinged together. Further, the plate 27' may have a handle means associated therewith, such as a small opening formed near an outer edge thereof.

Preferably, the storage receptacle 20 will be positioned rearwardly of the major (loop shaped) part of the frame 2, and will be primarily supported by the rear parts 80', 81' of the frame. The storage receptacle may be additionally supported by the rear guard 34 and the subframe 60, as depicted.

Figures 8, 9, 11:
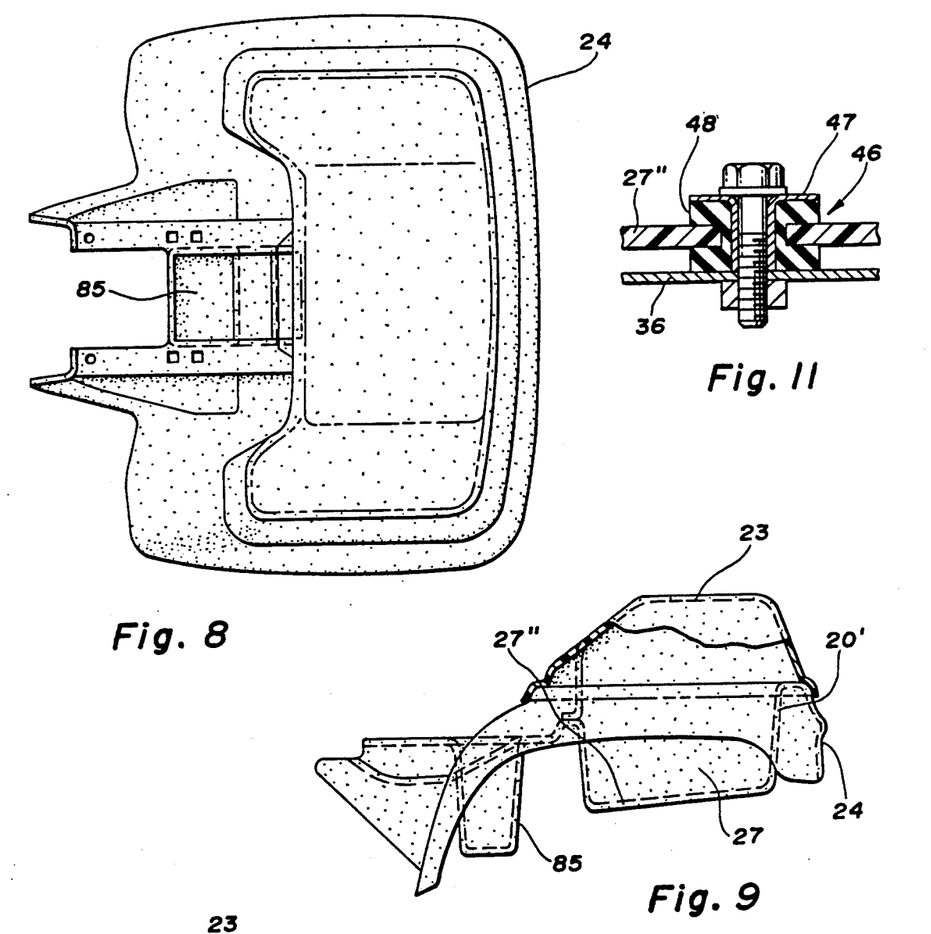
FIGS. 8-10 are a plan view, a side view, and a rear view, respectively, of an integral rear fender and storage receptacle unit of the vehicle shown in FIGS. 1-4.
FIG. 11 is an enlarged sectional view of a connection between the storage receptacle and the frame.
Figure 10:
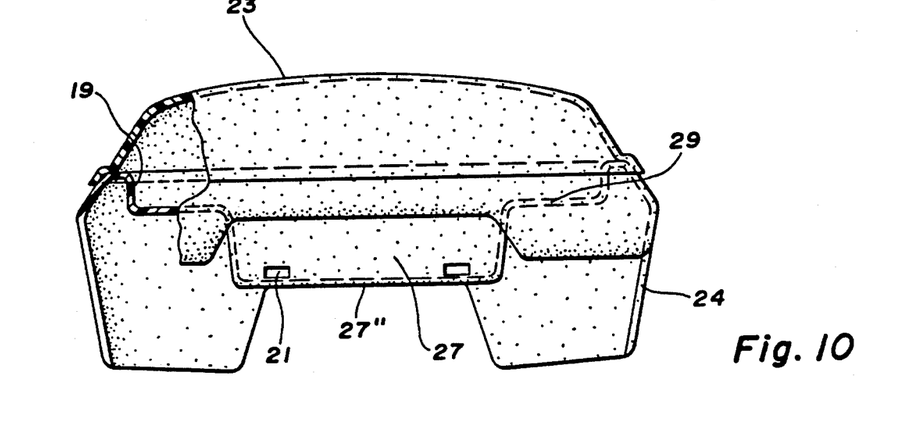
Figure 12:
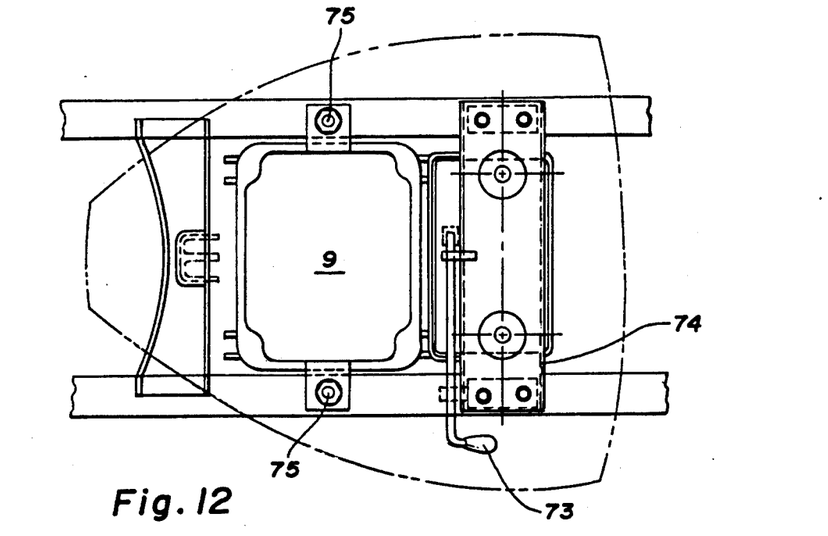
FIGS. 12-14 are a plan view, a rear view, and a side view, respectively, of a pivoting seat arrangement and of a support arrangement for the battery and air cleaner.
Figures 13, 14:
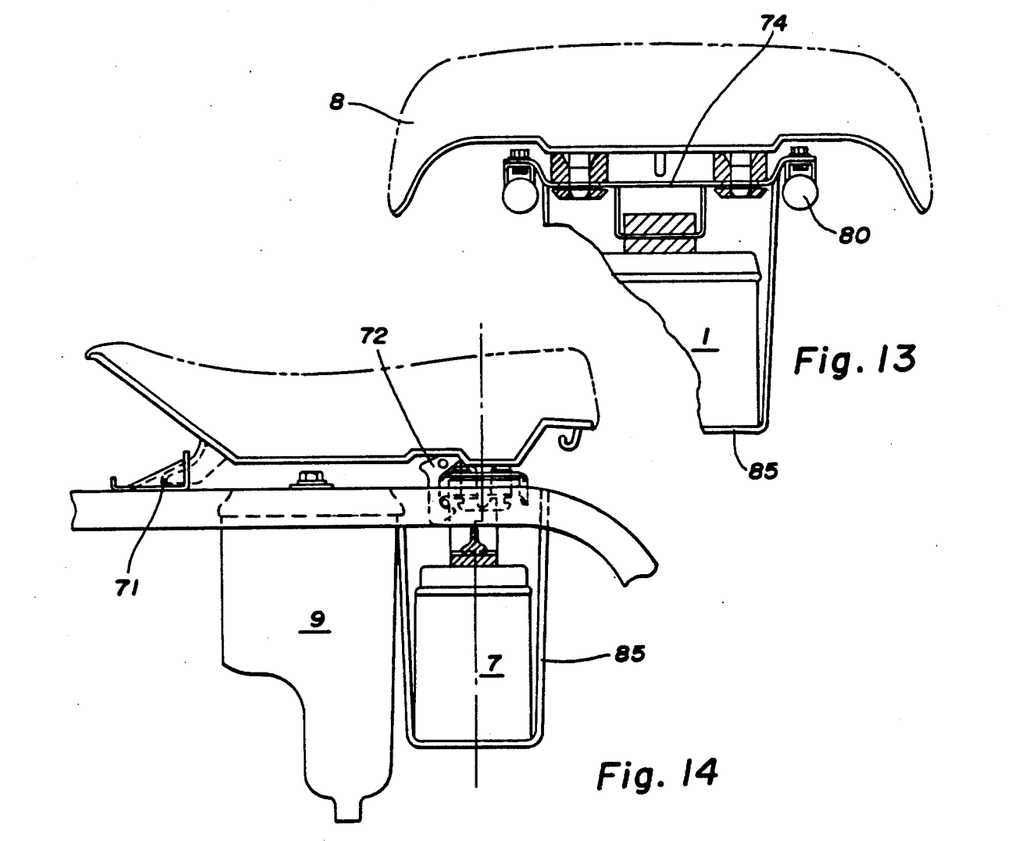

Particularly, the storage receptacle 20 is connected for support to the rear parts 80', 81' of the frame at connections 44 and to the cross member 35 of the rear guard 34 at connections 44'. If the optional subframe 60 is utilized, lateral side portions thereof will extend beneath the stepwise structure between the lower and laterally extending sections 27, 29 of the storage receptacle and the laterally extending section 29 will be secured to the subframe at connections 45. An enlarged sectional view of an appropriate connection 44' is shown in FIG. 11. Particularly, a bottom wall 27" of the lower section of the storage receptacle 20 is secured to the cross member 35 of the rear guard 34 through a nut and bolt type fastener. Additionally, a bushing 46, including a metallic portion 47 and an elastic portion 48 is provided between the bottom wall 27" and the bolt.

Inasmuch as the rear parts 80', 81' are positioned at a substantially lower level than the upper portion of the major, loop shaped part of the frame, the storage receptacle 20 is also positioned at a relatively low level. Such low positioning of the storage receptacle is advantageous because it assures good riding stability even if heavy objects are stored therein, and because the storage receptacle can be made relatively large without substantially increasing the size of the vehicle 1 relative to conventional vehicles that do not have storage receptacles.

It will be noted that the storage receptacle 20 is fitted to the rear frame, the rear guard 34 and the subframe 60 such that these components relatively closely surrounded outer surfaces of the receptacle. Such fitting desirably increases the rigidity of the receptacle as disposed on the vehicle.

As best depicted in FIG. 1 and 8-10, storage receptacle 20 is preferably located above the rear axle 28. Such location also favorably increases the rigidity of the storage receptacle as disposed on the vehicle 1. Further, the bottom wall 27" of the lower section of the storage receptacle is preferably inclined forwardly and has at least one drain hole 21 formed in a forward end thereof. Such forward inclination permits the bottom wall 27" to be disposed at a relatively low position without interfering with vertical swinging movements of the rear axle 28 and the rear swing arm assembly 14, and also helps to prevent objects stored in the storage receptacle from moving around. The angle of inclination may be substantially larger than that depicted in the drawings, and the rear frame will be inclined in a manner corresponding to the bottom wall 27". Also, the drain holes 21 will preferably be provided with removable covers 21' which would be used to prevent water and the like from entering the storage receptacle through the drain holes when the vehicle is traveling over a wet terrain.

Figure 2:
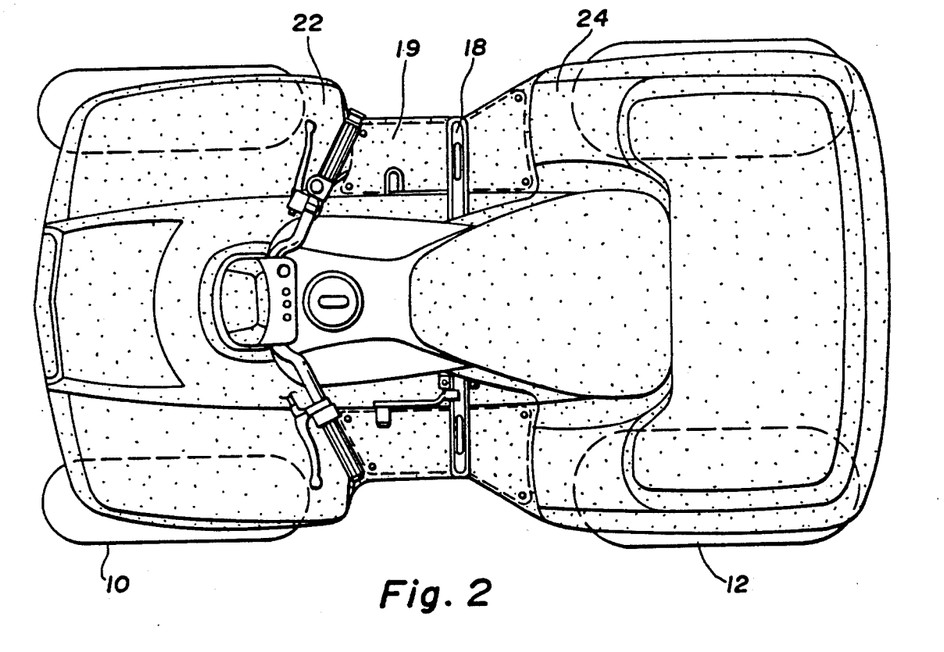
FIG. 2 is a plan view of the vehicle shown in FIG. 1.

As shown in FIGS. 1 and 2, a pair of short panels 19 are preferably provided beneath the foot supports 18 for interconnecting front lower portions of the rear fender 24 to rear lower portions of the front fender 22. The short panels 19 enhance the strength and rigidity of the fender 22.

Referring to FIGS. 1 and 3, a suspension means for the rear wheels 12 includes the rear swing arm assembly 14 and a cushioning unit 63. As depicted, the cushioning unit is preferably of a conventional type including a hydraulic damper and a coil spring provided in surrounding relation to the hydraulic damper. A lower end of the cushioning unit is pivotally supported by a bracket extending forwardly from a central portion of the rear axle 28, while an upper portion of the cushioning unit is pivotally supported by another bracket extending downwardly from a central portion of a cross member 56 interconnecting upper portions of the laterally spaced sections 80, 81 of the frame 2, proximal the rear frame parts 81', 81'. Although not shown, the vehicle's rear suspension may be modified to include a pair of laterally spaced cushioning units, each having a lower end thereof pivotally connected to a bracket extending forwardly from the rear axle 28, and having an upper end thereof pivotally connected to a bracket extending downwardly from a corresponding one of the laterally spaced sections 80, 81 of the frame. Further, the rear suspension means could be modified by connecting the lower end of the cushioning unit 63 to the swing arm assembly 14 through a pivoting link arrangement such that the entire cushioning unit would be positioned forwardly of the storage receptacle. Such a link arrangement would include a first link pivotally connected at a rear end thereof to a laterally extending member of the swing arm assembly 14 and a second link pivotally connected between a front end of the first link and lower portions of the sections 80, 81 of the frame. The lower end of the cushioning unit 63 would be pivotally connected to the pivoting connection between the first and second links, while an upper end of the cushioning unit could be connected to a cross member interconnecting the laterally spaced sections 80, 81. Again, this modification is not shown in the drawings.

As shown in FIGS. 1 and 3, the vehicle 1 also includes a muffler 70 which, in a depicted embodiment, extends longitudinally of the vehicle at one side thereof. The muffler 70 is preferably disposed below the bottom wall 27" of the lower section of the storage receptacle but substantially above the rear axle 28 so that it will not interfere with vertical swinging movements of the rear axle. Also in this regard, the muffler is preferably positioned in offset relation to driven means of the rear axle 28, such as the depicted sprocket 30' driven by the drive chain 30, as well as to a braking mechanism 62 provided on the rear axle. Such offset relationship further ensures that the muffler 70 will not interfere with the driven means and the braking means when the rear axle is vertically moved, and also ensures a better weight distribution or balancing of components at the rear end of the vehicle.

As shown in FIG. 3, a lower guard member 76 may be provided below the central part of the rear axle 28 for protecting the transmission means and the braking means 62 from engagement with the ground, rocks, or other foreign matter. The guard 76 would be secured to the swing arm 14 in an appropriate manner.

Referring to FIGS. 1 and 12-14, there is shown an arrangement whereby the battery 7 and air cleaner 9 are conveniently supported on the frame 2 below the rider's seat 8. In the depicted arrangement, the rider's seat 8 is pivotally connected to the frame 2 such that it can be swung forwardly about a hinge means 71 at a front end thereof, and is securable in a riding position through a latch means 72 at a rear end thereof. The latch means 72 can be selectively released through any appropriate means such as the depicted handle 73. Once the seat 8 is pivoted forwardly the battery 7 and the air cleaner 9 are exposed for ready access thereto. As shown, the battery 7 is suspended from an upper portion of the frame through a bracket 74 while the air cleaner 9 is suspended from the upper portion of the frame through brackets 75. If desired, the battery 7 may be disposed in the small storage receptacle 85, as discussed above.

Figure 15:
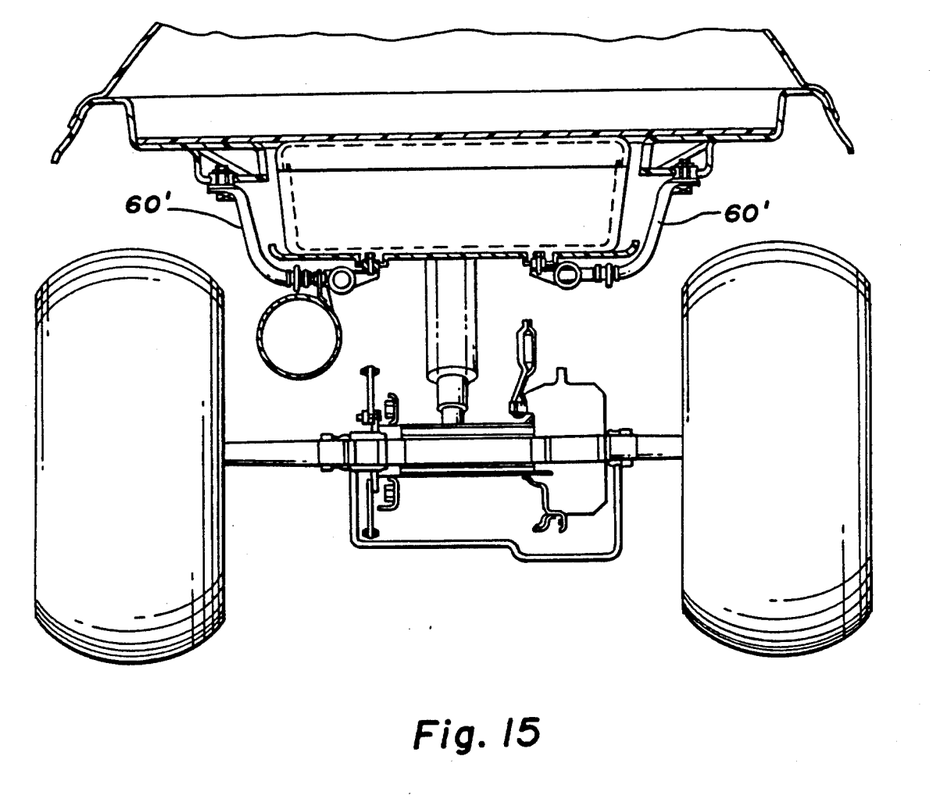
FIGS. 15-19 show modifications of a vehicle according to the first embodiment of the present invention.
Figure 16:
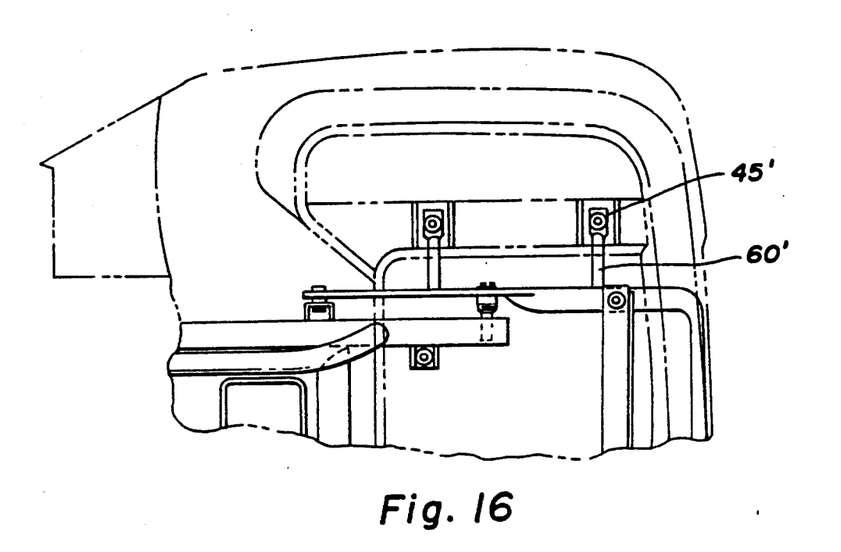

Referring to FIGS. 15 and 16, there is shown a modification of the optional subframe 60 of a vehicle according to the first embodiment of the present invention. In this modification, the rectangular ring is replaced by a plurality (four in the depicted modification) of lateral arms 60'. Two of the lateral arms 60' extend outwardly and upwardly from each lateral section of the rear guard 34 and have upper ends thereof connected to the laterally extending portion 29 of the storage receptacle 20 at connections 45'.

Figure 17:
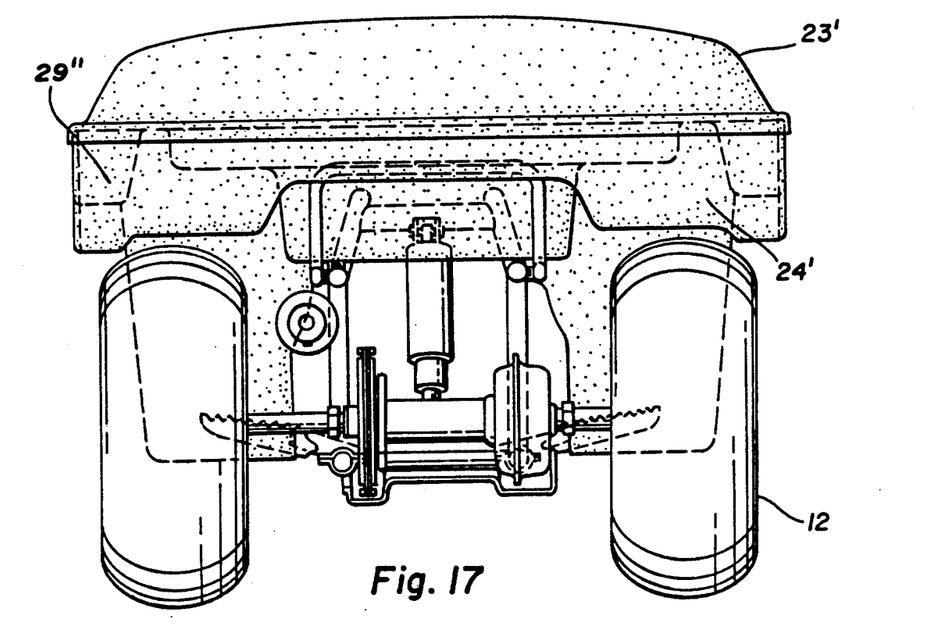
Figure 18:
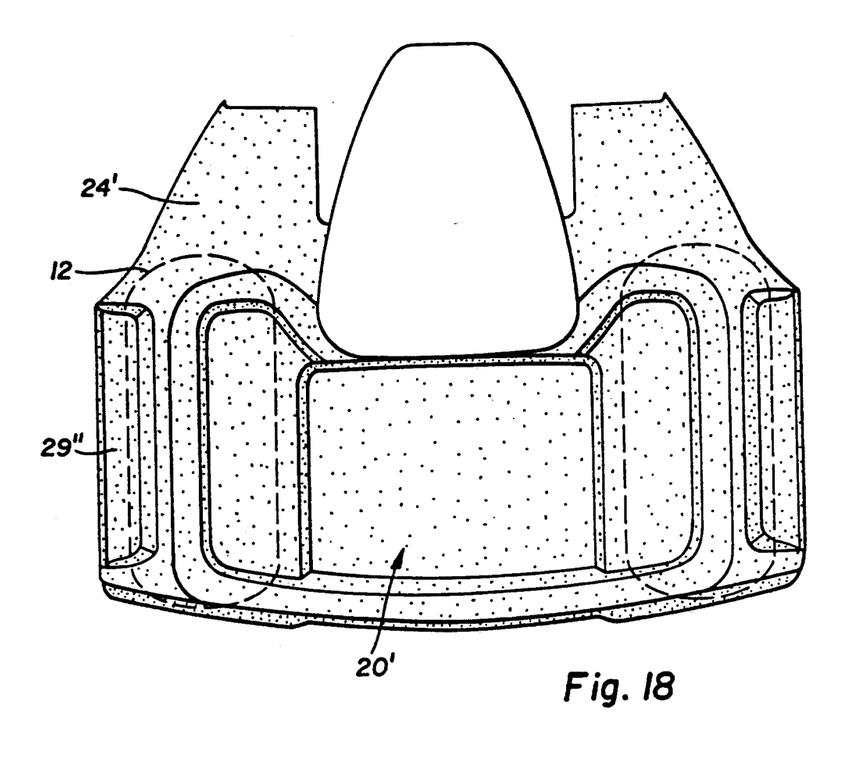

In FIGS. 17 and 18 there is shown another modification of the vehicle according to the first embodiment of the present invention. In this modification, the storage receptacle 20' extends laterally outwardly of the rear wheels 12 to define smaller side storage compartments 29" for storing small objects. In this modification, the storage receptacle 20' and the rear fender 24' are still integrally formed as a single unit, and the side storage compartments 29" are preferably covered by the lid 23'.

Figure 19:
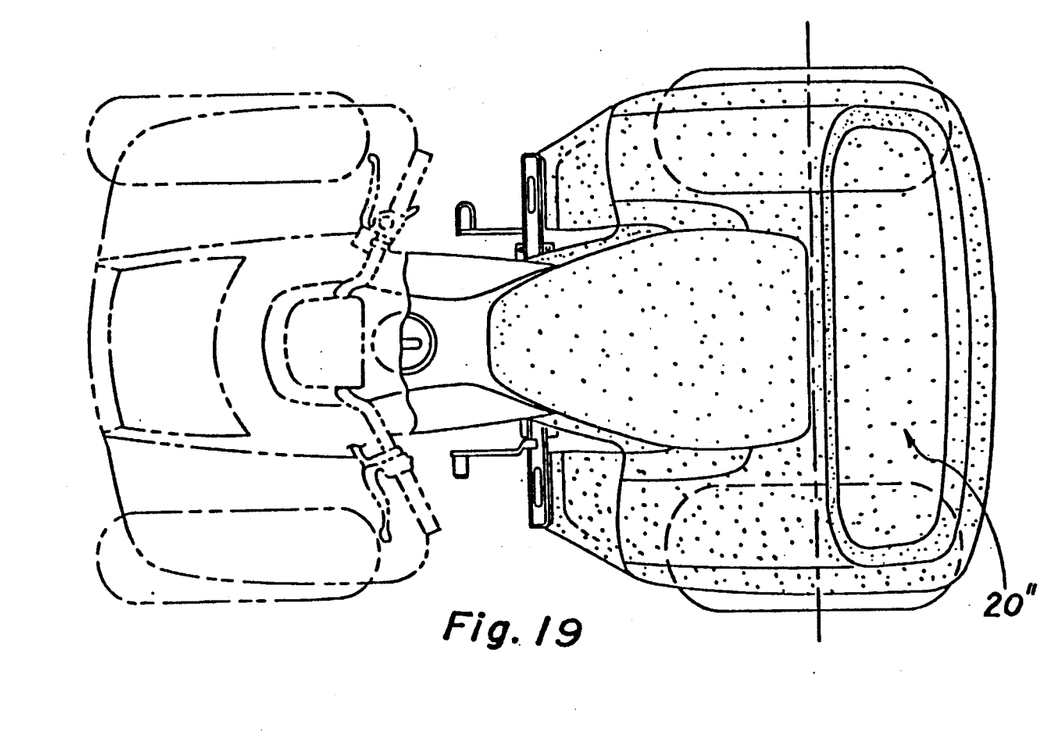

FIG. 19 is a plan view of another modification of the vehicle according to the first embodiment of the present invention in which the storage receptacle 20" is disposed rearwardly of the rear axle 28.

Referring to FIGS. 20-23, there is shown a saddle type, off-road vehicle 100 according to a second embodiment of the present invention. Many of the components of the vehicle according to the second embodiment are identical of substantially similar to the corresponding components in the first embodiment, and will not be discussed. Other components which are similar to those in the first embodiment will be referred to by a similar reference numeral having 100 added thereto.

The vehicle 100 according to the second embodiment of the present invention includes a frame 102 which supports a drive unit 116 including an internal combustion engine and a transmission means for driving the front and rear wheels 110, 112, a cooling means 113 for the drive unit 116, a storage receptacle 120, a front carrier or rack 117 and a rear carrier or rack 160. As depicted, the transmission means of the drive unit 116 can include a pair of driven shafts which drive front and rear axles 126, 128, respectively. The rear axle 128 is vertically, swingably supported on the frame 102 through a pivoting swing arm assembly 114. Two known swing arm arrangements for supporting a shaft drive transmission means are disclosed in U.S. Pat. Nos. 4,646,865 and 4,749,205.

Figure 23:
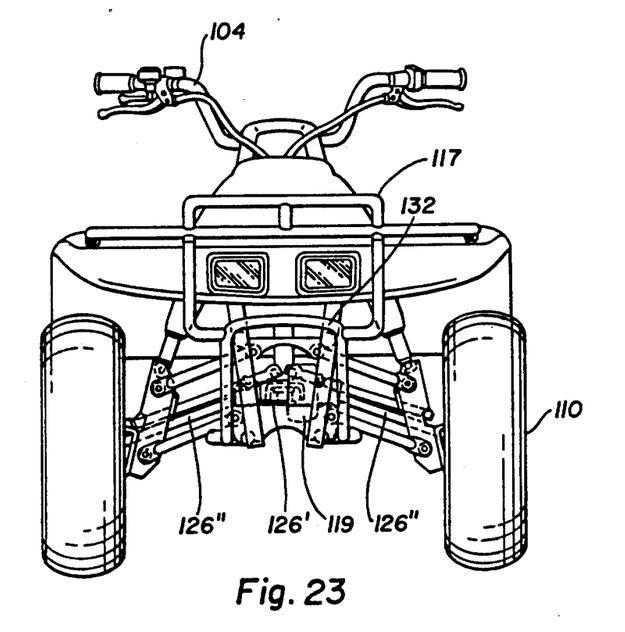
FIG. 23 is a front view of the vehicle shown in FIG. 19.

Referring to FIG. 23, the front axle 126 includes a central portion 126' which is non-pivotally supported on a front end of the frame 102 and a pair of side sections 126", each of which is pivotally connected between the central section and one of the front wheels 110. The front axle 126 has a differential 119 associated therewith, the differential being operatively connected to a front drive shaft 115 of the transmission means of the drive unit 116. Each of the front wheels 110 is independently suspended from the frame through a double wishbone suspension such as that used in the first embodiment of the present invention.

Similar to the frame 2 of the first embodiment, the frame 102 according to the second embodiment includes a pair of laterally spaced sections 80, 181, and a plurality of cross members connecting and reinforcing the sections; and the sections 180, 181 include major, loop shaped parts and small rear parts 180', 181'. The frame 102, however, differs from the frame 2 in several aspects. For example the frame 102 has a substantially different construction at a rear end thereof in comparison to the main frame of the frame 2. Particularly referring to FIG. 20, upper portions of the lateral side sections 180, 181 extends downwardly from a position near the steering handle 104 to a position near the rear end of the rear fender 124, and integrally include the rear parts 180', 181'. Also, a rear cross member 103 is preferably provided between a lower portion of the major part of each lateral section 180, 181 and the rear end of the corresponding rear part 180', 181' of the section.

The vehicle 100 also includes front and rear guards 132, 134 similar to the first embodiment, but the rear guard 134 is substantially shorter than the rear guard 34 of the first embodiment.

Additionally, the vehicle 100 includes the rear carrier rack 160, but does not include a subframe such as the subframe 60 of the first embodiment. The rack 160 is preferably connected to the rear guard 134 through welding, fastening means, etc., and is connected to the parts 180', 181' of the frame through brackets and appropriate fastening means, as depicted.

Figure 20:
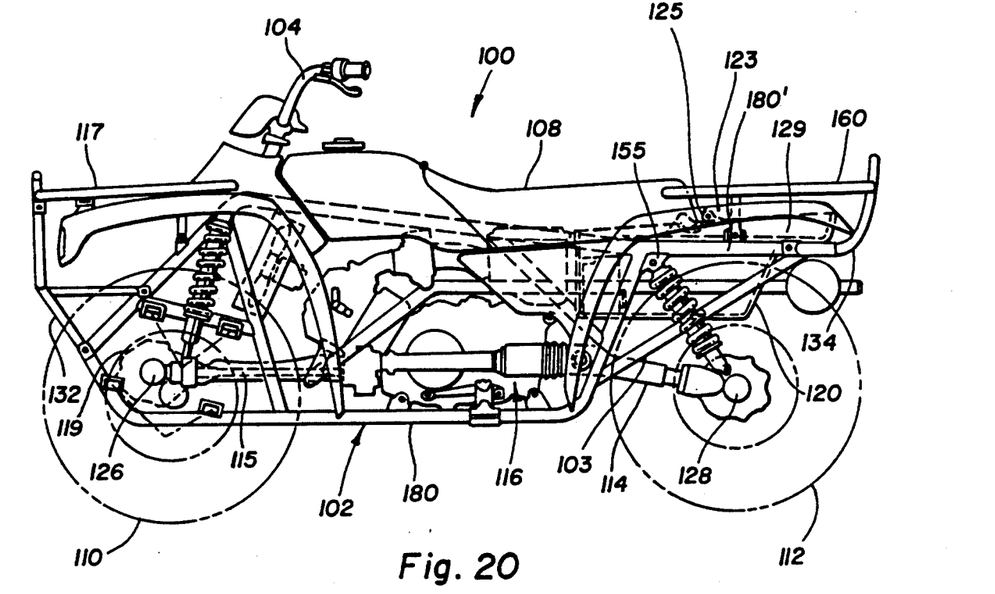
FIG. 20 is a side view of a saddle type, off-road vehicle according to a second embodiment of the present invention.
Figure 21:
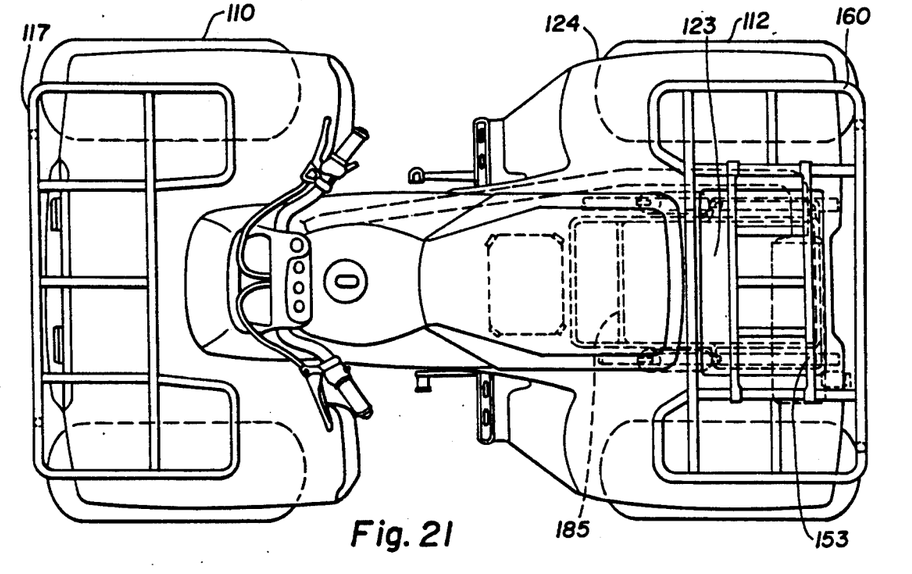
FIG. 21 is a plan view of the vehicle shown in FIG. 19.
Figure 22:
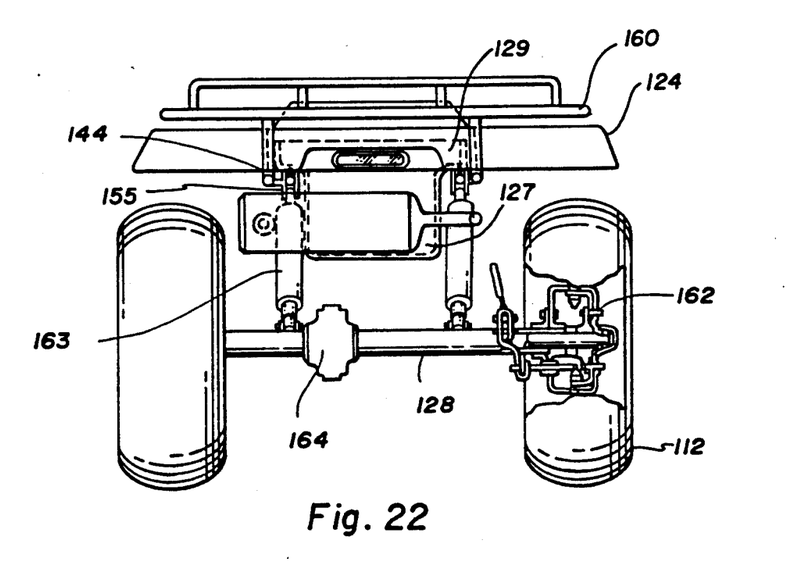
FIG. 22 is a rear view, partly in section, of the vehicle shown in FIG. 19.

As shown in FIGS. 20-22, the storage receptacle 120 according to the second embodiment of the invention extends from a rear end of the vehicle to a position beneath an intermediate portion of the rider's seat 108. The storage receptacle 120 preferably includes a main, lower section 127 which extends from a position above the rear axle 128 to a position beneath an intermediate portion of the rider's seat 108, and an upper section 129 which extends from a position near a rear end of the rear fender 124 to a position beneath a rear end of the rider's seat 108, and also extends slightly laterally from the upper end of the lower section 127.

A lid 123 is preferably provided for closing an open, upper rear end of the storage receptacle 120, while the rider's seat 108 covers the remaining front open portion of the receptacle. The lid 123 is pivotally hinged at a rear end thereof, while a front end 125 of the lid 123 cooperates with the lower rear portion 105 of the rider's seat 108 to hold the lid 123 in a securely closed position while the vehicle is traveling. The seat 108 is pivotally mounted such that it can swing forwardly, in a manner such as discussed above in relation to the first embodiment of the invention, to permit the lower rear end 109 thereof to cooperate with the front end 125 of the lid 123. Alternatively, the seat 108 could be made to pivot to one side in an open position while the lid 123 could pivot forwardly or sidewardly. Referring to FIG. 21, the rear carrier or rack 160 includes a central section 153 which would pivot upwardly and laterally to one side of the rack 152 for providing easy access to the container 120 and to permit the lid 123 to also pivot upwardly. The central section 153 will have an appropriate fastening means associated therewith for securing it in a lowered, operative position.

In a manner similar to the first embodiment, the storage receptacle 120 will be connected for support to the rear parts 180', 181' of the frame through appropriate fastening means. Particularly, as best shown in FIG. 22, the upper section 129 of the storage receptacle extends slightly laterally of the lower section 127 such that there is a stepwise structure defined therebetween, while the rear parts 180', 181' of the frame extend below the stepwise structure and are connected to the upper section 129 at connections 144. Further, a laterally extending cross member could be provided between the cross members 103 and/or rear ends of the major parts of the laterally spaced sections 180, 181 of the frame 2 so that a bottom wall of the storage receptacle 120 could be connected thereto for extra support. Again it will be understood that the receptacle 120 is fitted to the frame 102.

The storage receptacle 120 will preferably be formed integrally with the rear fender 124 as a single unit. In slight contrast to the first embodiment, the battery 107 is disposed in a front portion of the storage receptacle 120 rather than in a separate, smaller receptacle. As depicted, a partition 185 may be provided in the lower section 127 of the storage receptacle 120 for separating the battery 107 from other objects paced in the receptacle.

A pair of rear cushioning units 163, which cushion vertical swinging movements of the rear axle 128, are provided on opposite sides of the storage receptacle 120. Lower ends of the units 163 are connected to the rear axle 128, while upper ends thereof are connected to brackets 155 provided on the frame 102. Further, a muffler 170 is disposed laterally behind the lower section 121 of the storage receptacle 120 where it does not interfere with the rear axle 128 or a differential 164 on the rear axle. Additionally, a braking mechanism 162 cooperating with the rear axle 128 is positioned near an outer end of the axle where it is disposed substantially within a rim of a rear wheel 112. The braking mechanism 162 is thus offset from the storage receptacle 120 and will not interfere therewith. It is contemplated that the muffler 170 could extend longitudinally of the vehicle 100, in which case it would be positioned between the receptacle 120 and one of the rear wheels 112.

As best understood from the comparison of FIGS. 3 and 22, the storage receptacle 120 has a smaller lateral width than that of receptacle 20, but receptacle 120 extends further downward toward the rear axle 128 than does the storage receptacle 20 in relation to rear axle 28. Preferably, a lower portion of the lower section 127 will be positioned laterally between the rear wheels 112. Through such construction, the storage receptacle 120 is substantially less noticeable than the storage receptacle 20. Although not shown, the rear differential 164 may be disposed on the rear axle 128 laterally outwardly of the lower portion 121 of the storage receptacle 120 so that it will not interfere with a lower surface of the storage receptacle when the rear axle 128 swings vertically upwardly. Furthermore, the bottom surface of the storage receptacle 120 could be inclinded forwardly, downwardly to increase the storage area thereof, and to include one or more drain holes at the forward end thereof similar to the first embodiment.

Although there have been described what are at present considered to be the preferred embodiments of the invention, it will be understood that the invention can be embodied in other specific forms, and that many changes and modifications can be made to the above-described structure without departing from the spirit or essential characteristics thereof. The depicted embodiments are, therefore, to be considered in all aspects as merely illustrative, and not restrictive. The scope of the invention is indicated by the appended claims rather than the foregoing description.

We claim:

1. A saddle type, off-road vehicle, comprising:
a rigid main frame;
an engine supported by said main frame;
a seat supported on an upper portion of said main frame;
at least one front wheel supported by said main frame;
a pair of rear wheels disposed on opposite sides of said main frame;
a rear swing arm assembly supported by said main frame, said rear swing arm assembly supported by said main frame, said rear swing arm assembly in turn supporting a rear axle to which said rear wheels are connected;
a rear cushioning unit connected to said main frame;
a rear frame extending rigidly rearwardly from said main frame proximal said rear cushioning unit;
a storage receptacle supported by said rear frame portion above said rear axle and adapted to selectively store articles therein:
a rear end of said upper portion of said main frame being curved downwardly near a rear end of said seat;
said rear cushioning unit having a lower end thereof connected to said rear swing arm assembly near said rear axle, and an upper portion thereof connected to said rear end of said upper portion of the main frame; and
said rear frame portion being positioned at a level lower than said upper portion of the main frame, and extending rigidly rearwardly from said rear end of said upper portion of the main frame proximal said upper portion of said cushioning unit.

2. A vehicle according to claim 1, wherein:
at least a portion of said storage receptacle extends laterally above said rear wheels and a portion of said storage receptacle is positioned between said rear wheels.

3. A vehicle according to claim 1, wherein:
a bottom wall of said storage receptacle is forwardly inclined and is provided with at least one drain hole.

4. A vehicle according to claim 3, further comprising:
a removable cover for said at least one drain hole.

5. A vehicle according to claim 1, further comprising:
a rear fender formed as an integral unitary member with said storage receptacle.

6. A vehicle according to claim 1, further comprising:
a muffler positioned above said rear axle and below at least a portion of said storage receptacle.

7. A vehicle according to claim 1, further comprising:
a muffler; and
driven means and brake means for said rear axle, said driven means and said brake means being positioned in offset relation to said muffler.

8. A vehicle according to claim 1, further comprising:
a muffler positioned between said storage receptacle and one of said rear wheels.

9. A vehicle according to claim 1, further comprising:
brake means and driven means for said rear axle, said brake means and said driven means being disposed laterally of a bottom wall of said storage receptacle.

10. A vehicle according to claim 5, wherein:
said integral rear fender and storage receptacle is comprised of plastic.

11. A saddle type, off-road vehicle, comprising:
a rigid main frame;
an engine supported by said main frame;
a saddle type seat supported on an upper portion of said main frame;
at least one front wheel supported by said main frame;
a pair of rear wheels connected to a rear axle and disposed on opposite sides of said main frame;

a rear frame portion extending rigidly rearwardly from said main frame;

a storage receptacle supported by said rear frame portion above said rear axle and adapted to selectively store articles therein;

said storage receptacle having a large access opening defined in an upper surface thereof, and a front portion of said storage receptacle substantially abutting said seat such that said opening is disposed adjacent a rear end of said seat;

said opening being positioned at a level lower than the upper surface of said seat; and a lid for selectively covering said opening of said receptacle, said lid including means for cooperating with said seat to maintain the lid in a closed position.

12. A vehicle according to claim 11, wherein:

front half portion of said storage receptacle extends forwardly beneath said saddle type seat.

13. A vehicle according to claim 11, wherein:

at least a portion of said storage receptacle extends laterally above said rear wheels and a portion of said storage receptacle is positioned between said rear wheels.

14. A vehicle according to claim 11, wherein:

a bottom wall of said storage receptacle is forwardly inclined and is provided with at least one drain hole.

15. A vehicle according to claim 11, further comprising:

a rear fender formed as an integral unitary member with said storage receptacle.

16. A vehicle according to claim 11, further comprising:

a muffler positioned above said rear axle and below at least a portion of said storage receptacle.

17. A vehicle according to claim 11, further comprising:

a muffler; and driven means and brake means for said rear axle, said driven means and said brake means being positioned in offset relation to said muffler.

18. A vehicle according to claim 11, further comprising:

a muffler positioned between said storage receptacle and one of said rear wheels.

* * * * *

UNITED STATES PATENT AND TRADEMARK OFFICE
CERTIFICATE OF CORRECTION

PATENT NO. : 5,064,016
DATED : November 12, 1991
INVENTOR(S) : Kazuhiro Iwai et al.

It is certified that error appears in the above-identified patent and that said Letters Patent is hereby corrected as shown below:

```
Column 1, line 67, change "saddle-type" to -- saddle type --.
Column 5, lines 30 & 31, change "surrounded" to -- surround --;
          line 59, change "fender 22." to -- fender 22, 24. --.
Column 6, line 37, change "of the" to -- for the --.
Column 7, line 28, change "identical of" to -- identical or --;
          line 62, change "sections 80, 181" to -- sections 180, 181 --.
Column 9, line 56, change "structure" to -- structures --.
```

Signed and Sealed this

Twenty-third Day of March, 1993

*Attest:*

STEPHEN G. KUNIN

*Attesting Officer*        *Acting Commissioner of Patents and Trademarks*